Patented Nov. 9, 1926.

1,606,676

UNITED STATES PATENT OFFICE.

CARL B. URANN, OF WAREHAM, MASSACHUSETTS.

SPREADER.

Application filed June 24, 1925. Serial No. 39,264.

This invention relates to an attachment for vehicles, preferably motor driven, for the purpose of spreading sand, fertilizers, crushed stone or similar material evenly and to any desired thickness or depth.

An object of the invention is to provide means which may be driven from the wheels of the vehicle for causing the material to be delivered evenly and continuously from the vehicle while in movement.

A further object of the invention is to provide means whereby the attachment may be adjusted to vary the amount of material delivered in a given time.

A further object of the invention is the provision of a particular spring means for regulating the even delivery of the material.

A further object of the invention is to provide means for heating the delivering roll and driving pulleys in order that the sand or other material may not freeze thereto in cold weather and interfere with the proper operation of the device.

Other objects of the invention will be apparent from the following detail description and appended claims.

In the drawings:

Figure 1 is an end elevation of the attachment in position on the vehicle.

Figure 2 is a longitudinal section with the parts in elevation.

Figure 3 is a detail perspective view of a portion of the delivering roller.

Figure 4 is a side elevation of the attachment in position and in operative relation to the wheels of the vehicle.

Figure 5 is a side view of a detail.

Figure 6 is a perspective view of the end gate or tail board of the vehicle looking from the inside of the dump body.

Figure 10 is a side view of a modified form of the plate shown in Figure 5.

Figure 11 is a view of a modified form of driving device.

Figure 7:
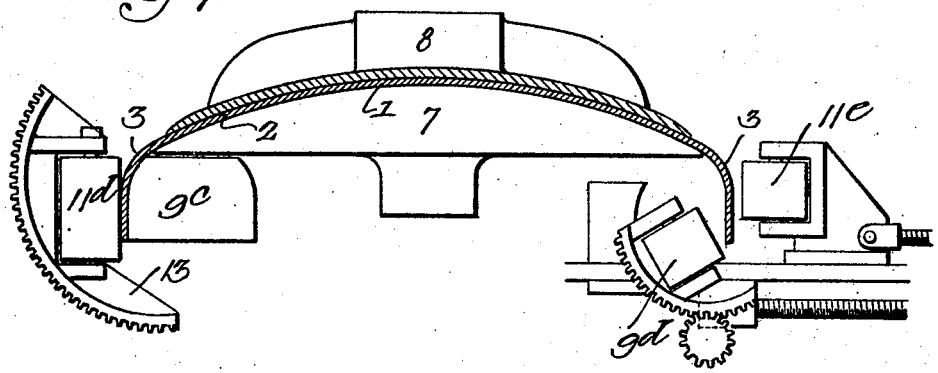
Figure 7 is a perspective view of a bracket and bearing blocks which support certain portions of the mechanism.

The construction embodying the subject matter of my invention can be attached to vehicles of widely varying types and therefore only a portion of the vehicle is shown. There is illustrated a portion of the chassis A, the rear axle B, rear wheel C, and dump body D. This dump body may be of the type which is tilted when it is desired to discharge the material or it may be of a type in which the floor slopes to the rear sufficiently for the material to move downward without tilting the body.

Fastened by bolts or suitable fastenings 1 to the rear ends of the sides of the body D are right angle brackets having a vertical portion 2 and a substantially horizontal portion 3. This horizontal portion is provided with slots 4 and bearing blocks 5 and 6 are held in adjusted position by screws or bolts 7 which pass through said slots and are threaded into the blocks 5 and 6. The bearing block 5 has openings 8 passing therethrough through which pass the spindles 9 of a roller 10 which is adapted to deliver the material from the vehicle. By suitable adjustment of the bearing blocks 5 and 6 the roller is positioned preferably so that its axis is substantially in the plane of the body of the vehicle although it may be located above said plane as illustrated. The roller is also positioned with relation to the end of the floor 12 so that strips 11 carried by the periphery of the roller will just clear the end of the floor as the roller rotates. These strips 11 may be of any desired number but are shown as being four in number and attached to the roller by screws. The materials of which these parts are formed may be varied as desired. The spindles 9 carried at or near their ends, pulleys or wheels 13 which are adapted to engage the periphery of the wheels C of the vehicle when the dump body is tilted into operative position and this frictional engagement is sufficient to cause the pulleys 13 and consequently the roller 10 to be rotated by the travel of the vehicle.

A tail board or end gate 14 has at its upper end a rod 5 the ends of which are suitably supported in the sides of the vehicle. Near the lower end there are attached to the tail board two strap members 16 having their ends forming eyes 17 in which slide members 18 and 19 both of which are pivoted to an operating member 20 which is pivoted to the tail board at 21. This construction is clearly shown in Figure 1 and

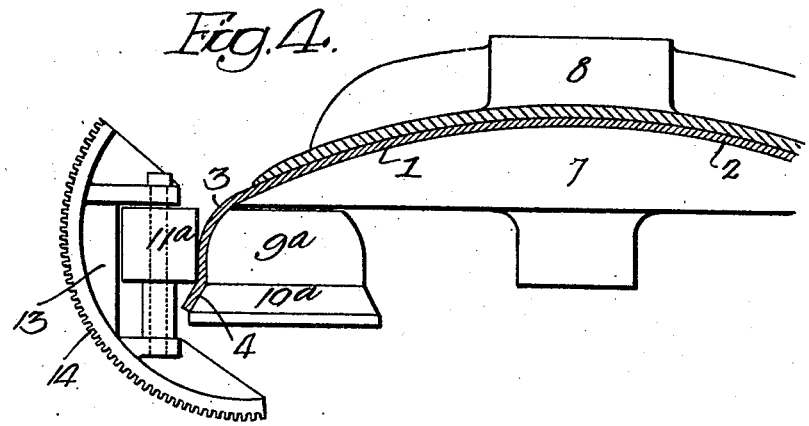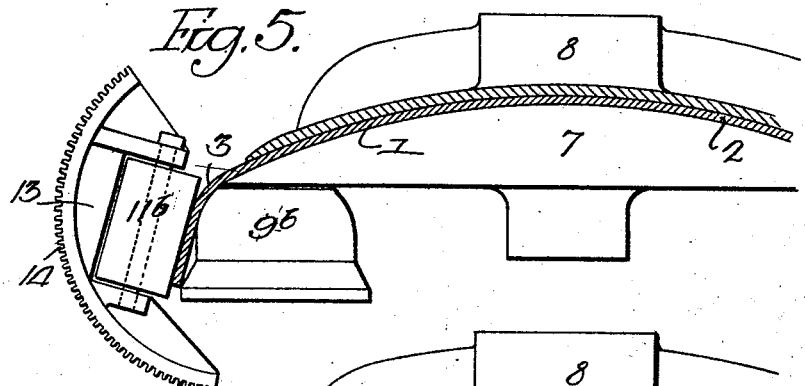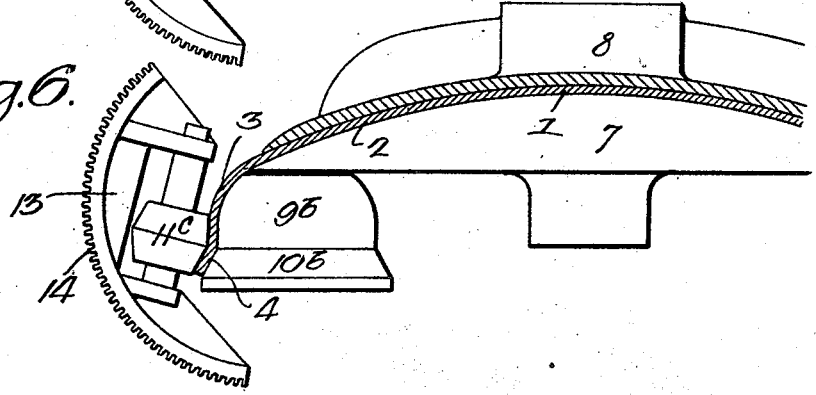

Nov. 9, 1926.　　　　J. H. VANDERSLICE　　　　1,606,677
FLANGING MACHINE
Filed Feb. 12, 1924　　3 Sheets-Sheet 3

Inventor:
John H. Vanderslice,
by his Attorneys.

Patented Nov. 9, 1926.

1,606,677

UNITED STATES PATENT OFFICE.

JOHN H. VANDERSLICE, OF COATESVILLE, PENNSYLVANIA.

FLANGING MACHINE.

Application filed February 12, 1924. Serial No. 692,256.

The object of my invention is to provide a machine for forming a bell-shaped flange on a head, which is to be secured to a shell by welding.

This is accomplished in the following manner, reference being had to the accompanying drawings, in which:

Fig. 1 is a sectional view showing a portion of a head having a bell-shaped flange located in position on a shell so that the parts can be connected together by welding;

Fig. 2 is a sectional view of a portion of a flanging machine illustrating the invention;

Fig. 3 is a diagrammatic plan view of the forming rolls with the rolled flange in section;

Figs. 4 to 9, both inclusive, are views illustrating modifications of the invention.

Referring to the drawings, 1 is a head of a boiler, tank, or other receptacle. The head has a dome-shaped portion 2, and a flange 3, which is bell-shaped, or flared, as at 4, Fig. 1. 5 is the shell of the boiler, tank, or other receptacle, the end of which abuts the flared flange, as shown in Fig. 1. The parts are welded together, as at 6.

Referring to Figs. 2 and 3, 7 designates a convexed former and 8 designates a concaved former. The head to be flanged is clamped between these two formers by the mechanism common to flanging machines. 9 designates a forming roller having a beveled portion 10, which corresponds to the flare that is desired for the bell-shaped flange.

11, 11 designate outer forming rollers that bear against the outer portion of the flange. Each roller has a tapered portion 12, conforming to the portion 10 of the roller 9. Each roller 11 is supported on a bearing 13 that has a segmental rack 14, which has a portion 15 that is adapted to a segmental guide in a vertically sliding frame 16. On the frame 16 is a shaft 17 that has a worm 18, which meshes with the rack 14. This shaft 17 is driven in the ordinary manner.

19 designates an adjusting screw for the frame 16. The upper end of this screw is carried by a bearing 20 on a longitudinally sliding frame 21, which can be moved towards and from the formers by an adjusting screw 22.

The head is flanged in the ordinary manner by rolling down the flange over the forming rollers 9. On continuing the movement, the end 4 of the flange 3 is flared by being rolled by the portion 10 against the beveled portion 12 of the rollers 11, producing the bell-shaped flange illustrated in Fig. 1.

A modification is illustrated in Fig. 4, in which the forming roller $9^a$ is similar to the roller 9 in Fig. 2. The rollers $11^a$ are not flanged. In this case, the flaring is accomplished by the portion $10^a$ of the roller 9, while the flange proper 3 is held by the rollers $11^a$.

Another modification is shown in Figs. 5 and 6, in which the method of forming the bell-shaped flange requires two steps. In Fig. 5, the main flange 3 is turned down over the forming roller $9^a$, which is similar in shape to the roller 9 in Fig. 2. By means of a long roller $11^b$, it assumes the position shown in said Fig. 5. Then the roller $11^b$ is moved out of the way and another frame is positioned in respect to the flange. This frame has a double conical roller $11^c$, which is located opposite the joint between the two portions of the roller $9^b$ so as to force the flange against the body portion of the roller $9^b$ and against the flared portion $10^b$ of the roller, producing the bell-shaped flange.

Figure 8:
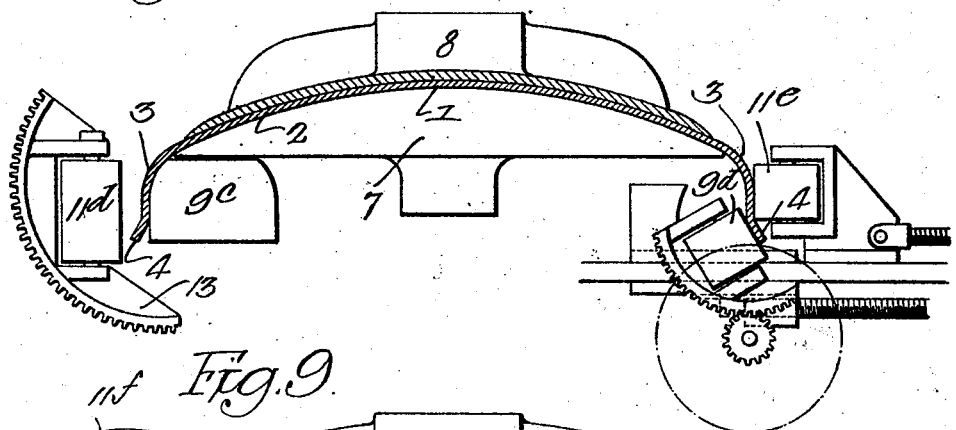
Figure 8 is a rear view similar to Figure 1 showing the heating attachment in position.

In Figs. 7 and 8, other modifications are illustrated, in which the main flange 3 is turned down by a plain roller $11^d$ and over a forming roller $9^c$, which is not provided with a flared portion. These two rollers are moved away and an outside roller $11^e$ is moved in contact with the flange 3. The end of the flange is flared by means of a roller $9^d$ that moves on an inclined axis. This roller is moved towards the flange and flares the flange while the main body of the flange is held by the roller $11^e$, as shown clearly in Fig. 9.

Figure 9:
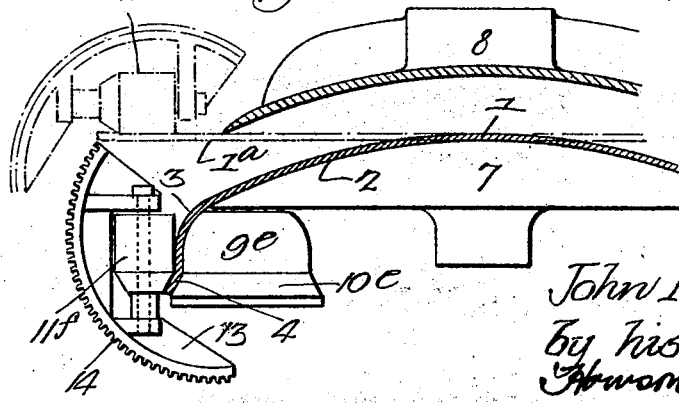
Figure 9 is a side elevation with parts in section of the construction shown in Figure 8 and taken on line 9—9 of said figure.

In Fig. 9, the flat blank $1^a$, from which the head is formed, as shown by dotted lines in Fig. 9, by being forced against a roller $11^f$. Then the blank is pressed in shape by the two formers 7 and 8, and flanged by the roller $11^f$, which is moved down into position opposite the roller $9^e$, which has a shaped portion $10^e$ that corresponds to the flare to be formed on the flange.

My invention can be used in connection with a type of flanging machine, such as disclosed in the patent granted to me on July 18, 1905, No. 795,180, in which the formers and the blank to be flanged are rotated past the forming rollers.

As illustrated in Fig. 2 of the present application, these forming rollers not only turn down the flange from the body of the blank, but also flare the flange to produce the bell-shaped flanged head shown in Fig. 1. Heretofore, this flaring was done by hand after the ordinary flange was formed.

I claim:

1. The combination in a flanging machine, of formers for forming the blank to be shaped; means for flanging the blank; and means for flaring the end of the flange to produce a bell-shaped flanged head.

2. The combination in a flanging machine, of two formers for clamping the blank to be flanged; means for rotating the formers and the blank; an inside forming roller having a beveled portion at its lower edge; and means for bending the blank to conform to the contour of the said forming roller to produce a bell-shaped flanged head.

3. The combination in a flanging machine, of two formers between which the blank is clamped; means for rotating the formers and the blank; an inside former having a beveled lower edge; and an outside roller having a tapered end opposite the beveled portion of the inside former so that, as the outside roller is brought into engagement with the projecting portion of the blank, the main flange will be formed and the end of the flange will be flared.

JOHN H. VANDERSLICE.